United States Patent [19]
Ascarelli et al.

[11] Patent Number: 4,487,810
[45] Date of Patent: Dec. 11, 1984

[54] THERMOPLASTIC COMPOSITIONS BASED ON NON-POLAR ORGANIC POLYMERS AND ZEOLITES IN ACID FORM; WHICH HAVE STRONG ADHESION TO METALS, AND COMPOSITE OBJECTS OBTAINABLE THEREFROM

[75] Inventors: Paolo Ascarelli, Rome; Gianfranco Boccalon, Passo Corese; Giuliano Moretti, Rome; Nicola Nistico'; Alberto Pelacani, both of Monterotondo, all of Italy

[73] Assignee: Enoxy Chimica S.p.A., Sassari, Italy

[21] Appl. No.: 491,037

[22] Filed: May 3, 1983

[30] Foreign Application Priority Data

May 7, 1982 [IT] Italy ................................ 21131 A/82

[51] Int. Cl.$^3$ ............................................. C08K 3/34
[52] U.S. Cl. ..................................... 428/461; 428/462; 428/463; 523/218; 524/450; 156/327; 156/333; 156/334

[58] Field of Search ................. 524/450; 428/461, 462, 428/463; 523/218

[56] References Cited

U.S. PATENT DOCUMENTS

| 3,036,980 | 5/1962 | Dunham et al. | 524/450 |
| 3,428,595 | 2/1969 | Tsukada et al. | 524/450 |

FOREIGN PATENT DOCUMENTS

| 49-23245 | 3/1974 | Japan | 524/450 |
| 55-92752 | 7/1980 | Japan | 524/450 |
| 2027036 | 2/1980 | United Kingdom | 524/450 |

Primary Examiner—Herbert J. Lilling
Attorney, Agent, or Firm—Hedman, Gibson, Costigan & Hoare

[57] ABSTRACT

A thermoplastic composition based on non-polar organic polymers and crystalline zeolites in acid form of which the exchangeable ions are totally or partly substituted by H$^+$ ions, the composition having strong adhesion to metals, the invention also relating to composite objects obtainable therefrom.

12 Claims, No Drawings

THERMOPLASTIC COMPOSITIONS BASED ON NON-POLAR ORGANIC POLYMERS AND ZEOLITES IN ACID FORM; WHICH HAVE STRONG ADHESION TO METALS, AND COMPOSITE OBJECTS OBTAINABLE THEREFROM

This invention relates to polyolefin-based low cost adhesives, and more generally to composite masses of non-polar organic polymers and crystalline zeolites, having lasting and strong adhesion to metal substrates. These composite masses are constituted by a fine dispersion of an inorganic component in an organic polymer matrix, the inorganic component being a zeolite in acid form which can be prepared by the total or partial substitution of its exchangeable ions by $H^+$ ions. The content of the inorganic constituent can vary from 0.1% to 70% by weight, and is present in the form of finely divided crystals. The polymer constituent of the mass, namely a polyolefin or mixtures of olefin and diolefin polymers and copolymers, is solid in the form in which it is used, and is applicable to the metal substrate in molten or plastic form. The composite masses are also solid in the form in which they are used, and are applicable to the substrates in molten or plastic form by the usual applicational methods for polymer constituents.

Said composite masses can be used for gluing together two equal or different metal substrates, or can be used as structural adhesives. They can also be applied as protective or ornamental coatings on a metal surface, or for preparing composite laminates constituted by a sheet of metal and a sheet of a mass of this kind joined together by adhesion.

The invention also relates to objects of composite structure obtained from metals to which a mass of this kind in the form of a covering film is joined by adhesion, and from equal or different metals joined together by adhesion by masses of this kind. These objects of composite structure are more resistant to mechanical peeling and more resistant to the action of moisture and organic solvents than the same objects joined together by adhesion using masses of the same organic polymers but not containing zeolites.

Non-polar organic polymers such as polyolefins are hardly suitable as structural adhesives for joining metals or metal parts together or as protective coatings for metals because they do not offer durable adhesion, even though they offer the advantages of low cost and high chemical inertia.

In practice, adhesion between polyolefins and metals is obtained under oxidation conditions, ie by methods in which the polymers are applied in molten form in the presence by oxygen, so that polar groups such as carbonyls, hydroxyls or carboxyl groups develop in the polyolefin, and it is known that previously oxidised polyethylene adheres to metals better than non-oxidised polyethylene.

High extrusion temperatures, even exceeding 300° C., and the presence of ozone are considered necessary, and are used industrially in processes comprising the coating of aluminium with polyethylene to prepare composite aluminium-polyethylene laminates with sufficient resistance to peeling.

However, oxidation is inevitably accompanied by polymer degradation phenomena, with the development of chemical species of low molecular weight. These phenomena are widely considered responsible for the fact that layers of weak adhesion arise at the metal-polymer interface. In practice, the adhesion obtainable suffers from serious limitations. These limitations affect not only the speed at which adhesion takes place and the resistance to mechanical peeling, but also, and in particular, the resistance of the polymer-metal joints to agents which promote detachment, such as moisture and organic solvents.

It is known that the introduction of polar carboxyl groups into polyethylene, such as acrylic acid used as a comonomer in ethylene polymerisation, enables polymers to be obtained which have greater adhesion to metal substrates. However, this method results in the preparation of polymers of higher cost, plus the loss of the special chemical inertia of the polyolefin. These materials are not properly suitable for joining together or coating substrates such as iron because of possible reaction between the substrate and the acid groups of the polymer. In the presence of moisture, these reactions catalyse and promote the corrosion of the substrate, in particular where any applicational defect or crack in the polymer coating is present. Other methods have been described for improving adhesion between polyolefins and metals, in particular concerning the treatment of the metal surface before applying the polymer mass.

Thus in U.S. Pat. No. 2,838,437 it has been proposed to treat the substrate surface with unsaturated organic acids in order to improve polyethylene adhesion.

U.S. Pat. No. 3,038,847 proposes to apply a base layer of amino-alkylsilanes as adhesion promotors to the metal surfaces before coating with organic polymers.

GB Pat. No. 1,303,022 proposes to treat the surface of an aluminium substrate with an aqueous solution of an amino-alkyl-hydroxy-silane before the adhesion of the polyethylene mixed with alumina. This patent also advises the usefulness of previously subjecting the polyethylene to extraction by organic solvents in order to free the polymer from impurities and additives which interfere with adhesion. These methods require pre-treatment either of the substrate or of the polymer, which can be impractical and costly when used on a large scale, and also of little use when absolute non-toxicity (release) of the materials is required, for example in composite aluminium-polyethylene laminates used for packaging foodstuffs.

The presence of non-toxic crystalline zeolites in the polymer mass which can properly disperse throughout the organic matrix in the form of fine crystals, ie a composite mass constituted by non-polar polymers and crystals of zeolites in acid form surprisingly effectively and advantageously improves the adhesion of polyolefins to metals without altering their chemical inertia properties.

The greater strength of adhesion of composite masses of this kind, and in particular the greater resistance of the adhesion joint to the action of moisture in composite objects, is in some way related to the particular structure of crystalline aluminosilicate zeolites which have a uniform system of infracrystalline channels or pores. Aluminosilicates of non-zeolite structure, such as clays, act only as fillers or as reinforcement material for the organic polymer, and are not useful for the object of the present invention.

Moreover, it is surprising that once prepared, the composite masses formed from anhydrous zeolites and organic polymers attain their object even after immersion in water or after preservation for many days in an environment of 70% relative humidity.

In addition to the advantage of low material cost, the excellent dispersability of zeolites in non-polar polymer masses enables homogeneous composite masses to be obtained over a wide range of concentrations, namely from 0.1% to 70% by weight, thus offering a wide range of uses and methods of application.

It is not necessary to subject the polymer constituent to purification processes such as solvent extraction. Commercial polymers to which antioxidants and thermal stabilisers are generally added can also be used.

In addition, stabilisation of the polymer constituent, in particular when this is sensitive to auto-oxidation such as polypropylenes and copolymers of ethylene with diolefins, is useful and desirable both during the preparation of the composite masses and during their application.

Masses of this kind attain their object even in the absence of special surface pretreatment of the metal substrates, or with adhesion promoters or base coatings. Both non-ferrous metals such as aluminium, zinc, titanium, chromium and nickel, and soft iron and steel are effectively joined together or coated after careful cleaning and de-greasing of the surface to which the composite mass is joined by adhesion.

The masses according to the present invention are constituted by an organic polymer or mixtures of organic polymers of a quantity of between 99.9% and 30% by weight, and at least one porous crystalline zeolite in the form of fine crystals having a particle size of less than 10 microns, with a water content of less than 8% by weight, an internal pore diameter of greater than 3 Angstrom, and a large surface area (measured by the B.E.T. method described by F. M. Nelson and F. T. Eggertsen in Analytical Chemistry, volume 30, pp 1387–1390, 1958) which is greater than 30 m$^2$/g, and preferably greater than 100 m$^2$/g. The zeolites useful for this purpose are those natural or synthetic zeolites, or silica-based synthetic materials having a zeolite structure, in which the H$^+$ ion substitutes more than 15% and preferably more than 50% of the exchangeable cations, so that said zeolites are acid, ie cause a N/10 solution of cesium chloride to assume a pH of less than 7, and preferably of less than 6, when 1 g of crystals is suspended in 30 ml of said solution.

This property is generally acquired by impregnating the crystals with ammonium salts, which can be salts either of organic or inorganic acids, and then calcining the material.

The inorganic constituent of the composite masses, ie a synthetic or natural zeolite or a porous crystalline synthetic material based on silica (SiO$_2$) with a zeolite structure is contained in a quantity of between 0.1% and 70% by weight, and preferably between 1% and 40%. The useful organic polymers are those polymers which are stable when mixed with zeolites in molten or plastic form. Particularly suitable are thermoplastic non-polar polymers such as olefin hydrocarbon polymers, diolefin hydrocarbon polymers, copolymers of olefin and diolefin hydrocarbons, and mixtures of said polymers and copolymers. Ethylene and proplyene polymers, copolymers of ethylene and propylene, copolymers of ethylene and butadiene, and polymers and copolymers of tetrafluoroethylene and hexafluoropropylene can all be used. Copolymers of ethylene with vinyl monomers such as vinyl acetate and vinyl chloride, and copolymers of butadiene with styrene can also be used.

Ethylene polymers and copolymers are particularly useful, and the following types of polyethylene are preferred: a low density polyethylene prepared by high pressure reaction using peroxide as the initiator; a low density polyethylene prepared by low pressure reaction using Ziegler catalysts and 1-butene comonomer; and a high density polyethylene prepared by low pressure reaction with Ziegler catalysts, using trialkyl-aluminium compounds as cocatalyst and 1-butene as comonomer.

All types of polyethylene prepared either by low pressure processes or by high pressure processes, having a M.F.I. (Melt Flow Index measured by ASTM-D 1238) of between 0.1 and 100, and a density of between 0.915 and 0.970 are particularly suitable for the purpose of the present invention.

As stated heretofore, the polymer can contain additives such as antioxidants in quantities generally contained in commercial polymers. Antioxidant quantities up to 1200 parts per million do not interfere with the application of masses having a zeolite content greater than 4% by weight.

Even impurities due to the presence of lubricants or detaching agents in the form of products of low molecular weight (polymerisation waxes) are tolerated in a quantity of less than 2000 ppm. Only in the case of masses containing less than 2% of zeolite is the tolerated additive quantity less than 500 ppm, and in particular the additives must be absent in applications in which material non-toxicity is required.

Zeolites suitable for the purposes of the present invention comprise all those natural or synthetic, and preferably synthetic, crystalline inorganic materials having a chemical composition in the anhydrous state corresponding to the general formula:

$$M_x D_{y/2} \cdot Al_m Si_n O_{2(m+n)}$$

which after dehydration or calcination above 400° C. exhibit a stable three-dimensional crystalline structure with a uniform continuous system of channels within the crystalline lattice; this being a system of channels, of mean diameter greater than 3 Angstrom, which are either communicating or non-communicating, and occupying a large fraction of the crystal volume, namely between 0.1 and 0.55 (measured as a fraction of hydratable volume) with respect to the entire volume occupied by the crystals.

In the hydrated form, the composition corresponds to the formula

$$M_x D_{y/2} \cdot Al_m Si_n O_{2(m+n)} \cdot pH_2O$$

and the three-dimensional crystalline structure remains practically unaltered during the hydration process and dehydration process. In said formula, M and D are monovalent and bivalent ions of metals, usually alkaline or alkaline-earth metals, partly or totally exchangeable with H$^+$ or NH$_4$ ions. In the formula, m can assume any value less than n. Putting n equal to 1, m can vary from 1 to 0.0001. In this respect, the following are suitable: synthetic aluminosilicate materials having a structure similar or analogous to natural products; aluminosilicate materials known only as synthetic and having a zeolite structure; synthetic materials based on silica, SiO$_2$, in which the molar Si/Al ratio is high, or in which Al is contained in traces, or in which aluminium is replaced by elements of which the oxides have an amphoteric character, such as Be, B, Ti, Cr, Mn, Zr, V, Sb or Fe, these materials having a highly porous crystalline structure of zeolite type. (A description of the structure and properties of zeolites and a systematic classification is given in the literature by D. W. Breck in "Zeolite Molecular Sieves" published by J. Wiley & Sons, N.Y., 1973).

The following materials are particularly suitable for the present purpose:

(a)
Synthetic zeolites of Faujasite type, known as Type X and Type Y zeolites.

The synthesis of Type X zeolites is described for example in U.S. Pat. No. 2,882,244 and Type Y in U.S. Pat. No. 3,130,007.

The chemical composition satisfies the formula $$0.9\pm0.2M_2O.Al_2O_3.wSiO_2.pH_2O$$

where M is an alkaline metal, w can vary between 2.5 and 6, and p can vary between 0 and 9.

M can be sodium or potassium or a mixture of sodium and potassium, and can be partly or totally substituted by hydrogens.

Of these materials, the preferred is Type 13X, available commercially as "Molecular Sieve" from Union Carbide Linde Division, or under the name of ZB-300 used as an ion sequestering agent.

(b)
Type A zeolites with a chemical composition corresponding to $$1.0\pm0.2M_2O.1.0Al_2O_3.1.85\pm0.5SiO_2.pH_2O$$

where p can vary from 0 to 8, and M is an alkaline cation substitutable by $H^+$.

These are available commercially for example from Merck & Co. Inc. or from Union Carbide Linde Division under the name of Linde 3A, Linde 4A, and Linde 5A.

(c)
Mordenite zeolites, namely aluminosilicates of sodium, lithium, calcium or mixed sodium and magnesium, with a $SiO_2/AlO_2$ ratio of between 2 and 5.7. Synthetic mordenite is preferred corresponding to the composition $Na_8((AlO_2)_8(SiO_2)_{40}).pH_2O$ where p can vary from 0 to 24, and $Na^+$ can be substituted by $H^+$ even totally.

Mordenite is supplied commercially by Norton Chemical Process Products under the name Zeolon.

(d)
ZSM zeolites, namely synthetic aluminosilicates and materials based on silica co-crystallised with oxides of metals of an amphoteric nature, which besides aluminium include beryllium, boron, titanium, vanadium, chromium, iron, manganese, zirconium and antimony, prepared by crystallisation in the presence of organic bases such as amino or diamines, or tetraalkylammonium bases. Those materials are particularly preferred which after calcining at a temperature greater than 400° C. and up to 700° C., completely lose water, whereas the organic base preserves a stable zeolite structure with a composition corresponding to the formula $(0.001-1)M_nO_m.1SiO_2$, where $M_nO_m$ is an oxide of one of the aforesaid elements.

The preferred materials are those in which M is titanium, indicated herein for brevity as titanium silicalites, and where M is boron, indicated as boron silicalites, or more concisely as boralites. When the Si/M ratio exceeds 30, the materials are practically crystalline silicas of zeolite structure, and are known concisely as silicalites.

These materials, as described in the U.S. Pat. applications Ser. No. 258.716 and Ser. No. 208.420 can be prepared with high purity and with a very favourable particle size of between $0.2\mu$ and $2\mu$.

As stated heretofore, before its dispersion in the organic polymer mass, the zeolite must be converted into an acid form, ie in which the exchangeable cations therein have been substituted partly or totally by $H^+$ ions, so that the pH when measured in a suspension prepared by stirring 1 g of crystals into 30 ml of a N/b 10 aqueous cesium chloride solution at 22° C. is less than 7 and preferably less than 6. All the zeolites can be modified for this purpose by a generally applicable procedure consisting of suspending the crystals in a solution of an ammonium salt at a temperature of between 60° C. and 90° C., and keeping the system under agitation for a time sufficiently long to allow a substantial permeation of the ammonium salt into the crystal interior. After exhaustive washing with water, the crystals are dried at 120° C. and progressively calcined until gaseous products completely disappear. The final calcining temperature is preferably at least 290° C. or greater.

The zeolite modified by this procedure is practically anhydrous, and it is preferable to immediately mix it with the polymer while the powder is still hot.

Alternatively, the dehydrated powder can be preserved in closed containers until the moment of use.

The particle size distribution of the zeolite is preferably less than $10\mu$ in order to obtain a perfectly homogeneous dispersion in the composite mass.

When said composite mass is used for decorative or protective coatings in the form of a thin sheet, or when the zeolite powder contains a significant fraction having a particle size exceeding $10\mu$, it is preferable to fractionate the inorganic material. This fractionation can conveniently be carried out in a centrifugal air classifier with zig-zag rotating channels, in order to eliminate crystals greater than $10\mu$ and preferably greater than $4\mu$ in size.

After calcining, the inorganic component can be dispersed in the organic polymer matrix by one of the conventional methods known in polymer processing, such as by means of an extrusion mixer. A cylinder mixer or a closed mill mixer for rubber are suitable. The preparation of masses with zeolite contents less than 10% is conveniently carried out starting from a polymer in the form of granules, by mechanically mixing the polymer granules with the required quantity of anhydrous zeolite powder in a closed container, finally extruding the mass through a double screw extruder. The mass leaving the extruder can be cooled by immersion in water.

The preferred procedure is the master batch method, by which a closed Banbury mixer is used, in which a quantity of zeolite powder up to 70% by weight of the polymer is added to the molten polymer. After the mass has been homogenised, it is extruded and cut into granules. Masses with a zeolite content of between 0.3% and 40% by weight are prepared by extruding master batch granules with a zeolite content of between 40% and 20%, with polymer granules in the required proportions.

Using this procedure, composite masses can be conveniently prepared which include two or more than two organic polymers and one or more than one zeolite.

To prepare the master batch, it is convenient to use polyethylene, preferably low density polyethylene with a melt flow index (measured by ASTM-D 1238 procedure A condition E) greater than 3 and preferably greater than 6, in order to obtain master batch masses of suitable fluidity in the molten or plastic state, and thus more easily miscible with the other polymers.

The master batch method is particularly convenient for preparing composite masses with polypropylene and butadiene copolymers, these polymers being sensitive to auto-oxidation, so that it is preferable to reduce to the absolute minimum the time for which these polymers are exposed to relatively high temperatures.

When used as structural adhesives, ie for glueing together metals or metal parts such as foils and sheets, or metal objects, whether the metals are the same or different, the most suitable composite masses are those having a zeolite content greater than 4% and preferably greater than 10% by weight, and up to 40% by weight. In this respect, the resistance to detachment also utilises the mechanical strengthening effect which the inorganic constituent gives to the polymer mass. The glueing can be executed by moulding the adhesive mass in the form of sheets or granules between the surfaces of the objects to be joined together, using these latter as the mould.

In practice, uniform adhesion is conveniently attained by applying the mass in the form of a sheet, of thickness greater than 0.2 mm and preferably between 0.2 and 0.6 mm, between the metal surfaces so that the entire area of the surface to be glued is covered.

Having arranged the object in this manner, it is preferable to exert a pressure greater than 1 kg/cm$^2$ in order to prevent exposing the contact surfaces and the mass to air.

The system is then raised to a temperature generally exceeding 150° C. and preferably between 175° C. and 250° C. for a time exceeding 1 minute and preferably between 5 and 25 minutes, the mass being preferably in the molten state in order to wet the substrate surfaces. The use of a press with hot plates is useful in this procedure, which is defifned hereinafter as "joining by direct metal-polymer adhesion". Alternatively, a useful procedure which can be used without limitation but is preferred for polymers particularly sensitive to auto-oxidation consists of coating the metal substrates separately with a first thin layer having a thickness greater than 0.05 mm and preferably between 0.1 mm and 0.3 mm, where the coating is obtained by metal-polymer adhesion of a composite mass constituted by 96–60% polyethylene and 4–40% zeolite, the zeolite quantity being preferably between 8% and 20%.

Pairs of objects coated in this manner are joined together by disposing between them, in contact with the surfaces of the coating, a sheet of polymer of thickness greater than 0.3 mm and having a weight equal to or greater than the sum of the weights of the coating masses.

The composite object arranged in this manner is raised to a temperature at which both the coating masses and the interposed polymer are in the molten state. In this manner, the joint is made by polymer-polymer adhesion between the coatings and the interposed polymer, ie by the in-situ formation of a composite adhesive mass.

This glueing procedure is referred to herein as "procedure for adhesive polyolefin coating with polymer-polymer jointing".

The latter procedure is preferred in particular when the interposed polymer mass is constituted by polymers which are easily subject to auto-oxidation, such as polypropylenes and butadiene copolymers, the resistance to mechanical detachment of the objects joined together in this manner being more uniform and on the average higher than that obtainable in our experience by direct polymer-metal adhesion.

In general and without limitation, polymers which can be used as the intermediate later in joints according to the present procedure comprise all those organic polymers which are miscible in the molten or plastic state with the polymer used in preparing the mass employed as the initial basic coating of the substrate, the preferred polymer in the masses used for the coating being a polyethylene, and the polymer used in the joint being any olefin polymer or copolymer based on olefin and diolefin monomers, or copolymers of olefin monomers with low-polarity vinyl monomers.

The composite masses useful as decorative or protective coatings, or as protective and decorative coatings, where in particular both improved polymer-metal adhesion and good transparency of the coating to visible light are required, and where the required coating is in the form of a film of uniform thickness between 5 microns and 100 microns, preferably between 10 and 60 microns, are those masses constituted by a polyolefin in a quantity between 96% and 99.9%, and preferably between 97% and 99%.

The constituent zeolite of the mass, in a quantity preferably of between 1% and 3%, is preferably chosen with a particle size of less than 4 microns, and an internal channel diameter greater than 6 Angstrom.

Masses constituted in this manner possess physical and rheological properties which differ little from the basic polymer, except for the greater adhesion to metal substrates used in the present invention. Films obtainable from such masses advantageously replace films of their constituent polymer, and are usefully utilised in all those coating processes which use polyolefins in this form, these processes being widely used and constituting the known art.

The masses according to the present invention are usefully applicable to metal substrates or to surfaces of metals which are normally used for structural purposes. Said masses are useful for obtaining joints between metal objects, or coatings on surfaces of metal objects. Metals useful for the present purpose are all those metals having an atomic weight higher than magnesium, such as aluminium, iron, steel, nickel, chromium, titanium, zinc, tin.

The preferred metals are aluminium, aluminium and magnesium alloys, iron and steel, whether in the form of sheets, plates or laminates, or objects obtained by pressure forming or casting.

The substrate on to which a composite mass of polymer and zeolite is joined by adhesion must have its surface perfectly clean, ie free from dirt, oil and grease.

In practice, degreasing is carried out with a chlorinated solvent such as dichloromethane or trichloroethylene, then carefully drying the object so as to remove all solvent residues. In the case of iron and steels, it is preferred to clean the surface by means of sandblasting or rubbing with abrasive paper, followed by degreasing using a solvent.

Some examples are given hereinafter to illustrate the usefulness of the invention and the preferred materials. These examples are only illustrative, and do not limit the present invention in any way.

EXAMPLE 1

This example, together with Example 2 which follows, illustrates the preparation of silica-based synthetic materials in the form of crystalline porous silicas of zeolite structure suitable for preparing adhesive composite masses.

30.5 g of tetramethylorthosilicate are placed in a pyrex glass vessel kept under a nitrogen atmosphere. The temperature is raised to 80° C., 14.6 g of triethylborate and 60 ml of water then being added, and the mixture being boiled under reflux, for one hour.

6 g of tetrapropylammonium hydroxide are added drop by drop, and a gel instantaneously forms which is crumbled and dispersed in distilled water. 2 g of potassium hydrate are added to the suspension, which is then kept under agitation and boiling for 20 hours.

The suspension is fed into an autoclave and heated to 175° C. for 6 days. The product, in the form of fine crystals, is dried at 120° C., then calcined at 550° C. for 4 hours in order to eliminate the entire organic part and the water.

The "boralite" thus obtained, containing alkaline cations and known as Boralite C, has the following composition: $SiO_2$ 74.9%; $B_2O_3$ 21.3%; $K_2O$ 0.02%.

It is in the form of crystals of size 2 microns, and has a surface area (measured by the B.E.T. method using $O_2$) of 410 $m^2/g$, and an intracrystalline pore diameter which ranges between 4 and 7 Angstrom.

EXAMPLE 2

This example illustrates the preparation of a material based on crystalline porous silica containing titanium as the silicon substitute, in a crystalline structure of zeolite type. Said material, known as titanium silicalite with an orthorhombic asymmetric structure, is obtainable at high purity, free from alkali.

455 g of tetraethylorthosilicate, 15 g of tetraethyltitanate and, in portions, 800 g of a 25 weight % solution of tetrapropylammonium hydroxide are fed into a pyrex glass flask under a $CO_2$ atmosphere. After agitating for one hour, the mixture is heated for 5 hours at 80° C. in order to complete the hydrolysis and to distil-off the ethyl alcohol which is evolved.

The mixture is diluted to 1.5 liters with water, and fed into an autoclave at 175° C., and kept under agitation for 10 days. The crystals are filtered off and washed with water until the wash water is neutral. After drying at 120° C., the product is calcined at 550° C. for 6 hours.

A highly crystalline material is obtained with a molar $SiO_2/TiO_2$ ratio of 33.4, which exhibits an oxygen absorption isotherm (measured by the B.E.T. method) which is typical of a zeolite or molecular sieve, with a pore volume saturation capacity of 0.18 $cm^3$ per gram of crystals.

EXAMPLE 3

This example illustrates the procedure for modifying zeolites by treatment with ammonium salts in order to obtain materials of suitable acidity for preparing composite adhesive means according to the objects of the present invention.

50 g of Type X zeolite (Linde 13X supplied by Union Carbide) previously sieved in order to remove the fraction having a particle size exceeding 3.6 microns, were suspended in a solution containing 50 g of ammonium nitrate in distilled water. After agitating for one hour with the temperature at 85° C., the solution was filtered and the crystals washed three times with distilled water.

The treatment was repeated a further two times, and the crystals were then dried at 120° C. for 6 hours.

The material was then calcined at 220° C. for 16 hours and then at 290° for 6 hours, completing the calcining at 350° C. for 4 hours.

After this treatment, 1 g of crystals was suspended in 30 ml of a N/10 solution of cesium chloride in distilled water at 22° C., and the pH was measured after one hour.

The pH was 5.1, whereas in the case of an untreated sample the pH was 10.9.

Samples of synthetic mordenite (Zeolon) and Type A zeolite (Linde 4A) were sieved and subjected to the same treatment, to register a pH of 2.5 and 5.9 respectively.

By means of an analogous procedure, but using ammonium acetate instead of the nitrate, the zeolite of Example 1, ie boralite, and the zeolite of Example 2, ie titanium silicalite, were modified to give materials having a pH of 2.1 and 3.9 respectively.

EXAMPLES 4–10

Samples of 7920 g of commercial low density polyethylene, namely Eraclene C 90, having a density of 0.919 and a melt flow index of 7.56 prepared by high pressure polymerisation in a vessel reactor and supplied in the form of granules of size 4 mm are mechanically mixed with 80 g of crystals of the various types of zeolite given in Table 1, including the zeolites described in Examples 1 and 2.

The zeolites are previously dehydrated at 400° C. for 4 hours, and mixed with the granules in a closed vessel. The dispersion is effected by means of a single screw extruder, extruding at a temperature of 150° C. Homogenisation is completed by a second extrusion of the mass. The products in the form of masses containing 1% of zeolite by weight and cut into granules of size 0.4 cm, were moulded into sheets of 0.3 mm thickness and having a side of 11 cm, these latter being used for glueing together pairs of aluminium sheets of size 13 cm × 13 cm × 0.15 mm thick, which had been previously degreased. These test pieces were joined together in a press at 178° C. for a time of 15 minutes under a pressure of 5 $kg/cm^2$, under which conditions the thickness of the polymer sheet acting as the adhesive between the aluminium sheets settles at about 0.22 mm on average.

After cooling, the test pieces are cut into strips of width 1.25 cm and length 13 cm, and their resistance to mechanical detachment is measured by a dynamometer by the peeling method at 180°, the detachment being effected at a constant speed of 6 cm per minute.

The results for each type of zeolite are shown in the accompanying Table 1, which indicates the upper and lower limits of the resistance to detachment recorded with four samples for each type of zeolite used, including four control samples containing only polyethylene without zeolite.

As can be seen from the table, sepiolite, which is a clay, induces no useful increase in adhesion to the substrate at the concentration used in the present example, whereas all the zeolites given by way of example induce a considerable increase in adhesion, even though they are contained only in small quantities.

TABLE 1

| Example | Zeolite | Peeling resistance (kg/cm) |
| --- | --- | --- |
| 4 | Control | 0.27–0.32 |
| 5 | Mordenite (H+) | 1.62–1.93 |
| 6 | Boralite | 1.82–1.95 |
| 7 | Titanium silicalite | 2.15–2.38 |
| 8 | Linde A | 1.55–1.75 |
| 9 | X (H+) | 1.80–1.95 |
| 10 | Sepiolite | 0.15–0.3 |

EXAMPLES 11–24

These examples illustrate the excellent workability of composite masses constituted by zeolites dispersed in polyolefins, and the practical advantages of adhesive masses which can be prepared by the methods currently used in processing thermoplastic polymers. Three samples of 1510 g of a commercial low density polyethylene, namely Eraclene M17, having a melt flow index of 19.96 and a density of 0.917 were mixed into homogeneous masses with three samples of 1080 g each of a ) Linde 13 X zeolite (Union Carbide), b) Linde 4 A zeolite (Union Carbide), c) Boralite zeolite prepared in accordance with Example 1, all the zeolites having been modified by the procedure of Example 3.

Homogenising was carried out in a closed mixer (Banbury type) at 60 r.p.m., maintaining the polymer samples molten at 150° C. and adding the anhydrous zeolite in portions over a period of 2 minutes, homogenisation of the mass being completed over a further period of 3 minutes.

A fourth mass (d) was prepared by means of a cylinder mixer by mixing 270 g of Linde 4 A zeolite with 378 g of Eraclene C 90 already used in the preceding examples. Homogenisation by this method took 7 minutes, the cylinders being kept at 140° C.

The four masses (a), (b), (c) and (d), each containing about 40% of zeolite by weight, were ground and cut into granules of sizes varying from 3 mm to 5 mm. These masses were used both as adhesives and as a master batch for preparing a series of adhesives containing about 11.5% of zeolite.

In the aforesaid order, portions of 1250 g of the master batch in the form of granules were mixed mechanically in a continuously rotating cylindrical vessel with 3000 g of granules of the polymers described hereafter. Mixtures of granules were thus obtained, which were extruded using a single screw extruder, the extrusion temperature being maintained at 150° C.

Each extrusion after cooling by immersion in water was cut into 0.43 mm granules. The adhesive masses contain 11.5% of zeolite, 17.5% of low density polyethylene, these constituting the initial master batch, plus 71% of chosen polymers in the following order: (e) a polyethylene of high density (0.955) copolymer with 0.5% of 1-butene having a melt flow index of 0.2 and prepared using TiCl$_3$ dispersed in MgCl$_2$ as catalyst, and aluminium triisobutyl as cocatalyst; (f) a copolymer of ethylene and butadiene with 2 mol% of butadiene, having a melt flow index of 0.2 and containing 500 ppm of ionol, 500 ppm of Irganox 1076 and 2500 ppm of calcium stearate; (g) a polyethylene of linear low density (0.9196) copolymer with 7 mol% of 1-butene, with a melt flow index of 0.66 and not containing additives; (h) a commercial low density (0.922) polyethylene, namely Riblene B25/4 with a melt flow index of 3.5, containing 500 ppm of ARMID-0 slip additive, and 100 ppm of ionol. The masses (a), (b), (c), (d), (e), (f), (g) and (h) were moulded into sheets having an average thickness of between 0.25 mm and 0.3 mm and a weight of 3 g, and the sheets were used to join together pairs of aluminium sheets following the procedure of Examples 3–12. The adhesion of these masses was measured by the resistance to detachment of strips of 1.25 cm × 13 cm, and checking for control purposes the resistance to detachment of similar objects joined together by adhesion using masses of polymers non containing zeolites. The effectiveness of the adhesive masses containing zeolites is shown by the adhesion values given in Table 2, where the detachment resistances recorded in practice are in reality less than the adhesion force at the interface between the metal substrate and the adhesive mass.

TABLE 2

| Example | Adhesive, polymer-zeolite (%) | Detachment resistance in kg/cm | Joint rupture |
| --- | --- | --- | --- |
| 11 | (a) Eraclene M 17 - X (40) | 2.25 | in the mass |
| 12 | (b) Eraclene M 17 - A (40) | 2.17 | in the mass |
| 13 | (c) Eraclene M 17 - Boralite (40) | 2.75 | in the mass |
| 14 | Eraclene M 17 (control) | 0.37 | at interface |
| 15 | (d) Eraclene C 90 - A (40) | 2.48 | in the mass |
| 16 | Eraclene C 90 (contol) | 0.32 | at interface |
| 17 | (e) High density PE - X (11.5) | 4.95 | in the mass |
| 18 | High density PE (control) | 0.29 | at interface |
| 19 | (f) Ethylene - butadiene - A (11.5) | 1.2–3.8* | mixed |
| 20 | Ethylene-butadiene (control) | 0.05 | at interface |
| 21 | (g) Ethylene/1-butene - Boralite (11.5) | 5.22 | in the mass |
| 22 | Ethylene/1-butene (control) | 0.82 | at interface |
| 23 | (h) Riblene B 25 - A (11.5) | 2.12 | in the mass |
| 24 | Riblene B 25 (control) | 0.09 | at interface |

*Adhesion is not homogeneous

The joint rupture in fact takes place as a cohesive rupture within the adhesive mass. In contrast, with the control samples, the detachment involves the breakdown of the polymer adhesion to the metal substrate (adhesive rupture).

The adhesive mass based on ethylene-butadiene copolymer, which is particularly sensitive to auto-oxidation, did not give a homogeneous joint when joining objects by direct polymer-metal adhesion. This limitation can be overcome by the special procedure illustrated in the following example.

EXAMPLE 25

1250 g of mass (d) of the preceding example was diluted with 3000 g of Eraclene C 90 by means of an extruder in order to obtain an adhesive mass containing 11.5% of zeolite Type Linde 4A.

Four sheets of polymer each weighing about 2.2 g were used to coat 4 aluminium sheets. Each polymer sheet was rested on each of the aluminium sheets of size 17×17 cm. After covering the free surface of the polymer sheet with a sheet of Mylar, each object was compressed at 180° C. in a press for 10 minutes, to develop a coating of about 0.12 mm thickness.

A pair (A) of said coated objects was joined together by disposing between them a sheet of ethylene-2% butadiene copolymer of the preceding example having a thickness of 0.4 mm and a weight of 8 g. The second pair (B) of objects was joined together by means of a sheet of polypropylene of 95% tacticity to which 0.15% of calcium stearate, 0.25% of ionol, 0.15% of DSTDP and 0.15% of polygard were added.

A pressure of 50 kg/cm² at a temperature of 210° C. was maintained for 17 minutes on the objects in this manner, to obtain a joint by way of a mass having a thickness of about 0.35 mm. The resistance to mechanical detachment of the objects joined together in this manner (procedure for adhesive polyolefin coating with polymerpolymer jointing) is shown in Table 3.

In addition to the advantageous increase in adhesion, the procedure herein described gives rise to considerably homogeneous adhesion.

TABLE 3

| Adhesive mass | Detachment resistance, kg/cm | Joint rupture |
| --- | --- | --- |
| A - (ethylene-butadiene) | 4.85 (homogeneous) | in the mass |
| B - (polypropylene) | 2.52 (homogeneous) | in the mass |
| polypropylene (control) | 0.05 | at interface |

EXAMPLE 26

4 polymer sheets each of 3 g weight prepared from mass (e) of Example 11-24 were used for joining 4 13 cm × 13 cm plates of AQ 34 steel to aluminium sheets of 0.15 mm thickness. The steel plates of 0.5 mm thickness were cleaned by sand blasting. The procedure for joining the steel to the aluminium was carried out in the same manner as the joining of aluminium to aluminium described in the preceding example. The resistance to detachment of the joint at the steel was measured by the following method: two strips of 1.25 cm width were cut from each sample; the adhesive mass was lifted from each strip with the aid of a blade and was mechanically detached from the steel for a length of 0.75 cm; the mechanical peeling tests were carried out at 180° on the objects arranged in this manner, by peeling the aluminium/adhesive mass assembly from the steel.

The recorded resistance to detachment was between 3.2 kg/cm and 3.5 kg/cm, and was limited by the cohesive rupture of the polymer mass. In the case of the 4 control samples, in which the adhesive was polyethylene which did not contain zeolite, the recorded adhesion force was between 0.65 and 0.98 kg/cm.

EXAMPLE 27

Joint resistance tests were carried out on composite steel/adhesive/steel and steel/adhesive/aluminium objects in a moist environment by immersing strips of width 1.25 cm in water at 80° C., four strips being cut from each sample. The adhesive used was the mass of Example 28, which in this case was used both for joining steel to steel and for joining steel to aluminium (see Examples 26 and 11-24).

The control used was an adhesive constituted by polyethylene containing 11.5% of anhydrous sepiolite (crystalline aluminosilicate with a non-zeolite structure). This adhesive mass was used for joining aluminium to aluminium.

The resistances to detachment with respect to time are shown in Table 4.

TABLE 4

| Time (hours) | on aluminium kg/cm | on steel kg/cm |
| --- | --- | --- |
| | Detachment resistance in water at 80° of adhesive containing zeolite | |
| 0 | 5.25 | 3.20 |
| 16 | 5.45 | 3.12 |
| 48 | 5.40 | 3.35 |
| 132 | 5.20 | 3.25 |
| | Detachment resistance of adhesive containing clay: | |
| 0 | 1.18 | |
| 16 | 0.35 | |
| 48 | — | |
| 150 | — | |

The results show the considerable improvement in the duration of adhesive joints made by composite masses containing a zeolite. At relatively high concentrations (11.5% in this case), although slightly improving adhesion to polyethylene, clay does not usefully improve the adhesion duration.

EXAMPLE 28

Sheets of 0.3 mm thickness and size 12 cm × 12 cm are moulded from a mass constituted by 82 weight % of low density polyethylene type Eraclene C 90 and 18 weight % of zeolite 13X, prepared by the procedure of Examples 13-24. Aluminium sheets of size 15 cm × 15 cm are joined by adhesion to polymer sheets of this kind in a press at 178° C. for 15 minutes, exerting a pressure of 5 kg/cm², after covering the free surface of the polymer sheet with a Mylar film.

4 strips of 1.25 cm width are cut from an aluminium sheet coated in this manner, and are immersed in 95% ethanol at 27° C. The resistance of the strips to peeling is tested every 6 hours by a dynamometer, by connecting the aluminium to the fixed clamp, and connecting to the mobile clamp the coating which has been previously detached from the substrate by means of a blade over a length of 0.7 cm. Even after 36 hours of immersion in ethanol, the samples are not peelable. The tension applied leads inevitably to a clean rupture of the coating along the line of contact with the substrate, the average rupture load being between 2.5 and 2.75 kg/cm.

In analogous experiments using an aluminium sheet coated only with polyethylene not containing zeolite, easy peelability of the coatings is obtained after 10 minutes of immersion in ethanol, with an average detachment resistance which is less than 0.85 kg/cm.

EXAMPLE 29

Sheets of 0.25 mm thickness and size 10 cm × 10 cm are moulded from the masses of Examples 4-10, containing 1% mordenite (H⁺) and 1% Linde 13X respectively. These sheets are used for coating two plates of AQ 34 steel of 0.5 mm thickness, which have been cleaned by sand blasting and cut into squares of 10.5 cm side. One each steel plate is rested a polymer sheet, the free surface of which is then covered with Mylar film. The mass is joined by adhesion to the substrate in a press at 180° C. and a pressure of 5 kg/cm² for 15 minutes. A control sample of the same steel is coated with polyethylene alone, using the same procedure.

A test of adhesion resistance in a moist environment is carried out on the objects coated in this manner. For this purpose, cuts are made in the samples and the control piece by means of a blade, through the entire thickness of the coating so as to divide the coatings into 100 squares of 1 cm side. The objects are immersed at 22° C. in an aqueous solution of a non-ionic neutral detergent prepared by dissolving 2 weight % of Triton X100 in distilled water. The test piece is inspected at various times by visually following the lifting and spontaneous delamination of the squares, and checking the peel-ability thereof by means of pliers.

After 18 hours of immersion detachment commences on the samples starting from the edges of the cuts in the case of 32% of the squares, these however being resistant to detachment. In the case of the control, 75% of the squares delaminate spontaneously within one hour.

EXAMPLE 30

A composite mass constituted by 97% of Eraclene C 90 and 3% of zeolite 13X, prepared by the procedure of Examples 13-26 from a master batch containing 40% of zeolite, is used for preparing a film in a plant for producing tubular film by the blowing method. The plant, which is continuously fed, comprises a single screw extruder with a head provided with a die of diameter 10 cm with a 0.73 mm aperture, and is fitted with a cooling ring.

The extrusion rate is firstly adjusted using polyethylene not containing zeolite, by controlling the blowing and the dragging speed in such a manner as to obtain a film of thickness 30 microns. Under the same conditions, the composite mass gives a film 25 microns thick. The film is uniform and homogeneous, and free from tears or burrs. In order to test the homogeneousness of the film, measurements were made on the transmission of visible light at a wavelength of 500 nanometers. The transmittance, measured at several points, is between 62% and 68%, compared with values of between 74% and 79% in the case of the film not containing zeolite.

In a second experiment, the dragging speed of the film under extrusion was increased until the film tore. Tearing occurred at a thickness of 8 microns. Using polyethylene not containing zeolite, tearing occurred at 7.5 microns.

EXAMPLE 31

This example illustrates the usefulness and advantages of the present composite masses with zeolites as a replacement for a polyolefin in those composite laminate production processes in which a thin coating of organic polymer is joined by adhesion to the substrate in the form of a laminated metal foil. In the present example, the substrate is aluminium, and the polymer, which is low density polyethylene, is replaced by a composite mass containing 1% of zeolite.

A plant for coating by means of extrusion was used in order to coat a laminated aluminium foil of 8 microns thickness and 40 cm width supported on paper.

The plant, which on a small scale reproduces an industrially used method, comprises a single screw extruder fitted with a flat head adjusted to an outlet slit of 1 mm over 40 cm.

The extruder head is pointed downwards at an angle of 45° and distant 12 cm from the substrate, which runs at a speed of 150 m/min over a rubber-coated roller. The laminate runs squeezed between the rubber roller and a second steel roller which rotates synchronised with the first roller and is water-cooled.

The plant is also provided with roller systems for reel unwinding and for rewinding the produced composite laminates on to reels. The extrusion speed was regulated by maintaining the screw rotation speed at 200 r.p.m.

Whereas the temperature of the extruder head is maintained at 320° C., the extruder body is under a temperature gradient extending from 270° C. to 310° C. The polymer mass leaves the extruder in the form of a liquid curtain at 320° C.

The extruder was fed continuously by charges of about 20 kg of polymer in the form of granules, for a time of 11 minutes, so as to coat approximately 1650 m (660 m$^2$) of substrate with a polymer coating which was uniform at 30 g/m$^2$. The charges were prepared by mechanically mixing 24.4 kg of Eraclene C 90 polyethylene in the form of pellets with 0.625 kg of granules obtained from a composite mass comprising 60% of Eraclene M 17 polyethylene and 40% of zeolite. This composite mass, the preparation of which is described in Examples 11-22, is used here as the master batch for co-extruding directly on to aluminium a composite mass, in the form of a thin coating, constituted by 99% polyethylene and 1% zeolite.

A second experiment was carried out separately for control purposes using a charge of only polyethylene, to again obtain a uniform coating of about 30 g/m$^2$.

The peeling resistance of the coatings was measured on strips of 1.25 cm × 12.5 cm cut from the central zone of the composite laminate parallel to the edge thereof, at intervals of 50 m.

Peeling was carried out in the opposite direction to that in which the laminate ran during the coating process.

The resistance to peeling measured on the coating containing zeolite was on average about 10 times greater than that measured on the control, being between 0.180 and 0.240 kg/cm compared with values less than 0.020 kg/cm recorded on the polythene coating not containing zeolite.

We claim:

1. A thermoplastic composition which comprises organic polymers and at least one anhydrous crystalline zeolite in acid form, of which the exchangable ions are replaced totally or partially by H$^+$ ions said zeolite having a particle size less than 10 microns and an internal pore diameter of greater than 3 Angstroms.

2. A thermoplastic composition as claimed in claim 1, characterised in that the crystalline zeolite in acid form is present in a quantity varying between 0.1 and 70% by weight.

3. A thermoplastic composition as claimed in claim 1, characterised in that the organic polymer is preferably chosen from olefin and/or diolefin hydrocarbon polymers and copolymers, including halogenated, copolymers of olefins with vinyl monomers, and copolymers of diolefins with styrene.

4. A thermoplastic composition as claimed in claim 1, characterised in that the zeolite component is preferably Type X zeolite in acid form.

5. A thermoplastic composition as claimed in claim 1, characterised in that the zeolite component is preferably Type Y zeolite in acid form.

6. A thermoplastic composition as claimed in claim 1, characterised in that the zeolite component is preferably Type A zeolite in acid form.

7. A thermoplastic composition as claimed in claim 1, characterised in that the zeolite component is preferably mordenite-type zeolite in acid form.

8. A thermoplastic composition as claimed in claim 1, characterised in that the zeolite component is preferably Type ZSM zeolite in acid form.

9. An article constituted by at least two equal or different metal substrates between which a thermoplastic composition as claimed in claim 1 is disposed.

10. An article constituted by a metal substrate coated with a thermoplastic composition as claimed in claim 1.

11. An article constituted in claims 9 or 10, characterised in that the metal is preferably chosen from aluminum, iron, steel, nickel, chromium, titanium, zinc, tin, magnesium, and aluminium alloys.

12. A method of improving the adhesion to metal properties of a thermoplastic resin, said method comprising adding to said thermoplastic resin from 4–40% by weight of an anhydrous zeolite in acid form of which the exchangeable ions are replaced totally or partially by $H^+$ ions said zeolite having a particle size less than 10 microns and an internal pore diameter of greater than 3 Angstroms.

* * * * *